UNITED STATES PATENT OFFICE.

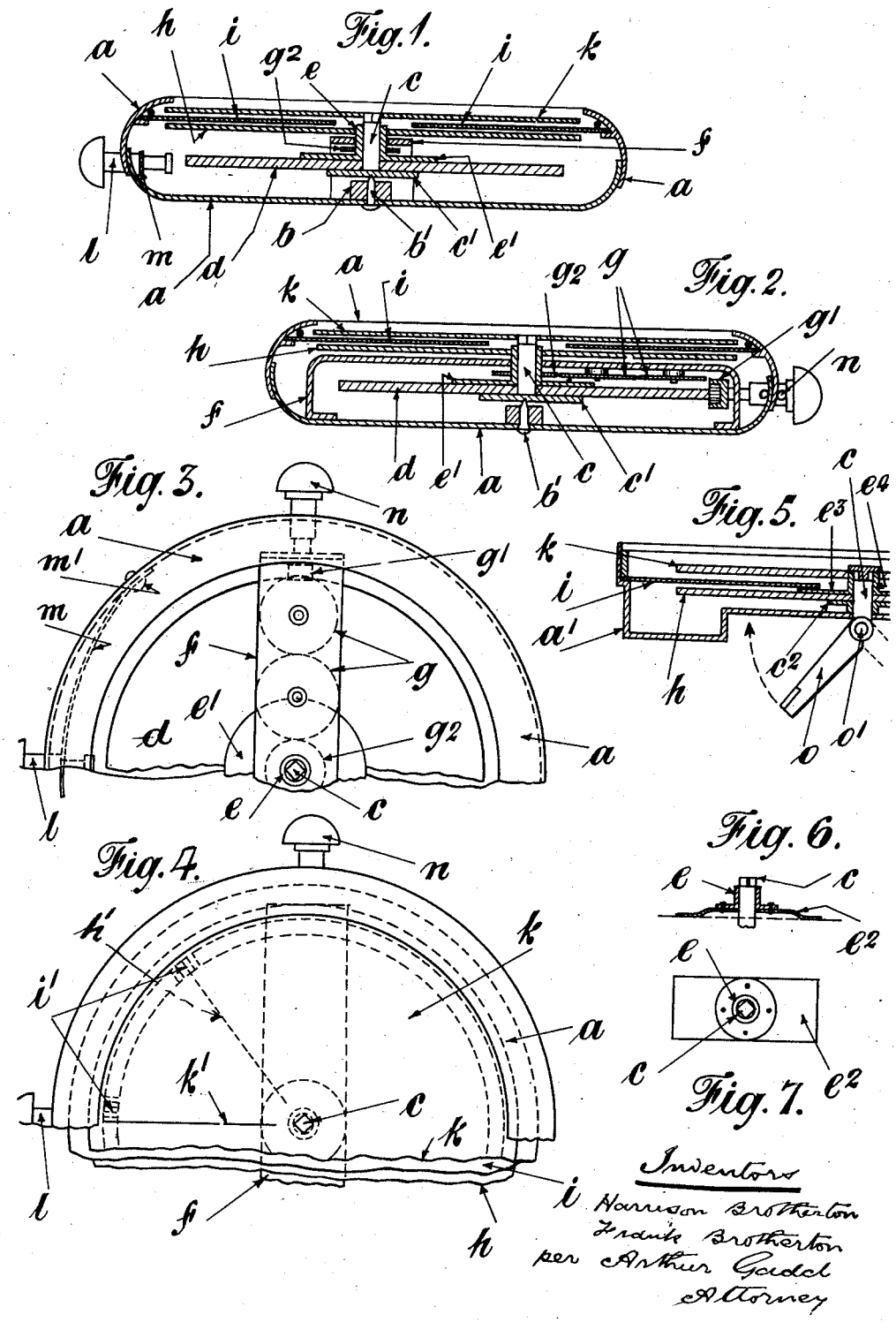

HARRISON BROTHERTON, OF BRIERFIELD, AND FRANK BROTHERTON, OF BOWDON, ENGLAND.

DEVICE FOR CALCULATING OR COMPUTING PURPOSES.

1,424,194. Specification of Letters Patent. Patented Aug. 1, 1922.

Application filed May 9, 1921. Serial No. 468,097.

*To all whom it may concern:*

Be it known that we, HARRISON BROTHERTON and FRANK BROTHERTON, subjects of the King of Great Britain, residing, respectively, at Brierfield and Bowdon, England, have invented certain new and useful Improvements in Devices for Calculating or Computing Purposes, of which the following is a specification.

The invention is for a device wherewith calculations or computations may be made, and has for object the provision of means for rendering the device simple and effective in use, said means involving the employment of a fixed dial or dials (on which the necessary scales are marked or provided) relatively to the body of the device itself.

The accompanying drawings illustrate forms of our invention by way of examples, and in which Fig. 1 is a vertical section, and Fig. 2 a similar view at right angles therewith, of a calculating or computing device referred to. Fig. 3 is a part plan view of Fig. 1, an upper portion of the latter being removed. Fig. 4 is a similar part-plan view with said portion included.

In the aforesaid views the cover glass or transparency provided for conveniently closing in the contained parts, but without interfering with the view of the same, has been omitted for the sake of clearness.

Fig. 5 shows in part, a sectional view of a modified or cheaper form of device, as compared with the one previously referred to. Figs. 6 and 7 are respectively sectional elevation and plan views of a modified detail.

With reference to Figs. 1 to 4 inclusive, $a$ is the casing of the device or instrument, at the central part of which is shown attached or soldered a base block $b$, through which a pin $b^1$ is passed and connected by screw thread therein. The upper end of $b^1$ forms a pivot for a spindle $c$, the extended base part $c^1$ of which is attached in any convenient manner to a disc $d$, and hereinafter referred to as a brake-disc.

A sleeve or collar $e$ is shown about the spindle $c$, and capable of moving freely around the same. According to our invention, an extension $e^1$ from $e$ is in frictional contact with the upper surface of the brake-disc $d$. That is to say, the collar device $e$ $e^1$ carries round the disc $d$ by friction only, and when the motion of $d$ is arrested or prevented, the motion of spindle $c$ attached to it also ceases.

$f$ is a bridge piece connected to the base of the casing $a$, and supporting revoluble gear wheels $g$ depending from it. These wheels are capable of being driven by means of a small crown wheel $g^1$ at the one extremity, and of driving a gear wheel $g^2$, the latter being fixed to the collar $e$ aforesaid.

The gears $g$, $g^1$, $g^2$ are merely indicated slightly detached for the sake of clearness.

Attached to the collar $e$ is a disc $h$, on which is marked a radial line $h^1$, (Fig. 4) to form the equivalent of a pointer.

$i$ is a transparency, (such as celluloid) fixed in position within the casing $a$ in any suitable manner, and with a central hole, so as to be quite clear of the collar $e$ or the part of the spindle $c$ projecting above the latter.

This transparency or disc $i$ has marked upon it suitable divisions, according to the use of the device intended, a few of which division marks being indicated merely at $i^1$ in Fig. 4.

A further transparent disc $k$ is shown above the disc $i$, which former disc is attached to the upper end of the spindle $c$. Such disc $k$ also has a radial line marked upon it to form the equivalent of another pointer; said pointer equivalent is indicated at $k^1$ in Fig. 4.

$l$ is a push-button passing through and freely mounted in the casing $a$ of the device, the inner end of which button device or spindle is capable of coming in contact with the periphery of the brake-disc $d$ at will. The device $l$ is shown restrained by a flat or plate spring $m$, said spring being connected to the casing $a$ by means of connections such as at $m^1$ at its two extremes, (Fig. 3). Said extremes are assumed to be slotted for being capable of working on the shanks of the pins $m^1$, and the spindle of $l$ passes through a central hole in said spring. The latter bears against a shoulder on the device named.

In this manner the movement of the brake-disc $d$ may be arrested or prevented when desirable. On the other hand, the movement of the collar $e$ is under the control of a revoluble milled-head device $n$, the spindle of the latter having the crown wheel $g^1$ attached thereto. Said crown wheel clears the periphery of the disc $d$.

It will be seen that when the device $n$ is turned, the gear wheels $g$ to $g^2$ are thus put in motion, and the collar device $e$, $e^1$, thus rotated. If the brake disc is at the moment free to move, said brake-disc and spindle $c$ are also carried round by frictional contact with $e^1$, and both pointers $h^1$, $k^1$, move simultaneously and equally around the circular path. But if the disc $d$ be braked, and thus prevented from moving, the collar device $e$, $e^1$, under the action of the gears referred to, moves about its axis independently of the disc $d$ and spindle $c$.

In this latter event, the upper pointer or marking $k^1$ remains stationary, and the one indicated at $h^1$ moves round independently.

In practice, the distance between the discs $h$, $k$, and the marked disc $i$ would be made as small as possible.

In the modification shown in Figs. 6 and 7, illustrating a further application of our invention the collar $e$ has an extended or frictional part $e^2$ in the form of a plate spring, for ensuring sufficient frictional contact between itself and disc $d$.

In the modified form of instrument indicated partly in Fig. 5, the spindle $c$ has pivoted to its lower end external to the casing $a^1$ a pair of wings or arms $o$ (one being shown in full lines only for the sake of distinction).

The arms aforesaid are assumed to be shown in the open condition, for enabling them to be taken by the thumb and finger of the user, and twisted for the purpose of turning spindle $c$.

Attached to spindle $c$ is disc $h$ provided with a pointer marking as before, and in frictional contact with $h$ according to our invention is the extension $e^3$ of collar device $e^4$. $e^4$ is capable of freely moving around spindle $c$, and the transparent disc $k$ is attached to its upper end part. $i$ is the transparent disc between $h$ and $k$, on which a suitable scale is marked circumferentially.

A button or like brake device (not shown) is capable or arresting or preventing the movement of disc $k$ in the present example, when the disc $h$ may be moved independently by the operation of the wing device $o$. When not in use, said parts of the device $o$ may be folded inwards, as indicated by arrow line, so as to lie within a recess in the base of the casing $a$.

It will be seen, with reference to Fig. 5, that no gearing as in Figs 1 to 4, is necessary, the pointer disc $k$ being braked directly, and the device $o$ being capable of moving the disc $h$.

We prefer that the uppermost pointer be the one which is capable of being arrested in its motion during operation of the milled head device $n$ or equivalent.

The operation of the device is similar to what has been accomplished with other forms of like devices employing a fixed dial and movable pointers or equivalents.

For example, to obtain the simple result of $2 \times 3$, the milled head device $n$ is twisted until the pointer $k^1$ comes to the number marked 1 on the scale, the position of the other pointer $h^1$ being immaterial. Now the button $l$ is pressed and whilst this brake pressure is maintained the turning of the milled head device $n$ is continued until the pointer $h^1$ comes to the number 2. The pointer $h^1$ is now in advance of the pointer $k^1$ by a scale length representing log. 2. The pressure on $l$ is then released and the rotation of $n$ continued, both pointers move simultaneously and equally along the scale, so that this constant scale distance of amount log. 2 between them is maintained. Therefore, when the pointer $k^1$ comes to 3, thus traversing a scale length representing log. 3 from the mark 1, the other pointer $h^1$ has reached the position or scale length representing log. 2 plus log. 3, from the mark 1, and hence the pointer $h^1$ points to the number representing the product $2 \times 3$.

Similarly, to obtain the result of $\frac{8}{2}$ for example, the pointer $k^1$ is set to the mark 1 on the scale as before, and again, whilst the brake pressure on $l$ is maintained, the pointer $h^1$ is set to the number 2. If now the brake pressure is released, and the rotation of $n$ continued, the two pointers move simultaneously and equally along the scale with the constant scale length representing log. 2 between them, so that when the pointer $h^1$ has come to the mark 8, the other pointer $k^1$ has reached the position representing a scale length of log. 8 minus log. 2, and hence the pointer $k^1$ has reached the position corresponding to the quotient $\frac{8}{2}$.

In the example of Fig. 1, the particular disc $d$ capable of being braked is a matter of choice, the instrument being here arranged to that end. Also, we prefer to use markings on transparent surfaces, instead of using actual pointers, because of the tendency of the latter to become bent or deformed sometimes.

We claim:—

In a device of the kind specified, a centrally mounted collar with a broad flange bearing against a pointer disc connection solely for forming connective frictional means whereby the motion of the one pointer disc is transmitted to a second one, when the braking operation is not introduced, and an externally operated button braking device capable of bearing peripherally against one of said pointer disc connection when required, substantially as herein set forth.

In testimony whereof we have affixed our signatures.

HARRISON BROTHERTON.
FRANK BROTHERTON.